United States Patent [19]

Lindsay

[11] 4,264,245

[45] Apr. 28, 1981

[54] KEYLESS HOLDER FOR PIN-TYPE REPLACEABLE CUTTING INSERTS

[76] Inventor: Harold W. Lindsay, 2480 NW. Vaughn, Portland, Oreg. 97240

[21] Appl. No.: 67,688

[22] Filed: Aug. 20, 1979

[51] Int. Cl.³ .............................................. B26D 1/12
[52] U.S. Cl. ........................................ 407/41; 407/49; 407/105; 407/108
[58] Field of Search ...................... 407/48, 49, 46, 40, 407/41, 103, 104–108

[56] References Cited

U.S. PATENT DOCUMENTS

| | | | |
|---|---|---|---|
| 3,188,717 | 6/1965 | Heinlein | 407/42 |
| 3,788,625 | 1/1974 | Lindsay | 407/40 |
| 3,946,475 | 3/1976 | Hopkins | 407/104 |
| 4,195,955 | 4/1980 | Lindsay | 407/40 |
| 4,202,650 | 5/1980 | Erickson | 407/48 |

*Primary Examiner*—Leonidas Vlachos
*Attorney, Agent, or Firm*—Klarquist, Sparkman, Campbell, Leigh, Whinston & Dellett

[57] ABSTRACT

A holder or nest for pin-type replaceable cutting inserts has a back face and a front face parallel to the back face for supporting a pin-type replaceable cutting insert of the type having a circular aperture centrally disposed therein. A pin extends perpendicularly to the front face of the holder, on which pin the cutting insert is received. The holder comprises an extension having a face coplanar with the back face of the holder itself. The extension further comprises a threaded aperture to receive a screw which serves to clamp the holder and the cutting insert into a recess in the cutter body.

4 Claims, 5 Drawing Figures

KEYLESS HOLDER FOR PIN-TYPE REPLACEABLE CUTTING INSERTS

BACKGROUND OF THE INVENTION

This invention relates to holders or nests for replaceable disposable cutting inserts used in cutting tools and, more particularly, to such inserts of the pin-type having circular apertures centrally disposed therein.

A cutter for pin-type replaceable cutting inserts of the above-mentioned type is disclosed in my U.S. Pat. No. 3,788,625. That cutter includes peripheral, radially extending recesses in which the replaceable disposable inserts are received. A holder or nest is positioned in each recess adjacent the back face of the insert, the insert being retained on an integral pin extending from the front face of the holder and by a lip formed by a chip clearance cut out at the front of the recess. A keying lug on the back face of the holder is received in a keyway in the recess and includes a screw threadedly receivable in the cutter body. The screw serves to clamp the holder and the insert in the recess with the cutting face of the insert being engaged by the lip.

The construction shown in the above-mentioned patent poses a problem in the case of small diameter cutters which may provide insufficient back-up or support for the holder. The provision of the keying lug on the back face of the holder necessarily increases the circumferential dimension of the holder and insert assembly. Where the cutter body itself is of small diameter, there may be insufficient material to accommodate the keying lug.

It is thus the primary object of the present invention to provide an insert holder or nest for pin-type replaceable cutting inserts that will obviate the necessity for a keying lug on the back face of the holder and consequently, the necessity for a keying recess or keyway extending circumferentially thereof.

It is a further object of the present invention to provide an insert holder or nest for pin-type replaceable cutting inserts that will provide a screw means receiving extension on the holder which extension is coplanar with the back face of the holder, whereby the circumferential extent of the holder and insert assembly is minimized.

It is a still further object of the present invention to provide a holder or nest for pin-type replaceable cutting inserts that will comprise axially extending screw receiving means coplanar with the back face of the holder to minimize the circumferential extent of the required recess as, for example, in rotary cutters of small diameter.

It is a still further object of the present invention to provide a holder or nest for pin-type replaceable cutting inserts which will achieve precise location of the insert as respects the work-facing surface of the cutting tool.

SUMMARY OF THE INVENTION

My insert holder or nest is provided with the usual face for supporting a pin-type replaceable cutting insert having a circular aperture centrally disposed therein. An integral pin extends perpendicularly to the face of the holder for retaining the insert in a supporting relationship adjacent the face. The insert holder is receivable in a recess in the cutter body, which recess has an inwardly extending back wall and a front wall parallel thereto, the back and front walls defining a bottom surface or wall therebetween, the bottom surface providing a support for at least one side of the insert. The cutter body further includes a cutout extending from the front wall of the recess and meets the front wall to form a lip therewith.

My insert holder has a back face adapted to abut the back wall of the recess. The holder has a front face generally parallel to the back face and from which the insert retaining pin extends.

The holder further comprises a screw means receiving extension having a back face coplanar with the back face of the holder. The extension has a front face generally parallel to the back face and adapted to abut the front wall of the recess in the cutter body. Screw means are provided in the extension for moving the holder and the insert inwardly of the cutter body to force the assembly into the recess and engage the front face of the insert with the lip.

The extension comprises a supporting surface perpendicular to the front face of the holder and a locating boss on the supporting surface to support a second side of the insert. A second boss is disposed on the extension between the front and back faces thereof for engagement with the bottom surface of the recess.

DESCRIPTION OF THE PREFERRED EMBODIMENT

Figure 1:
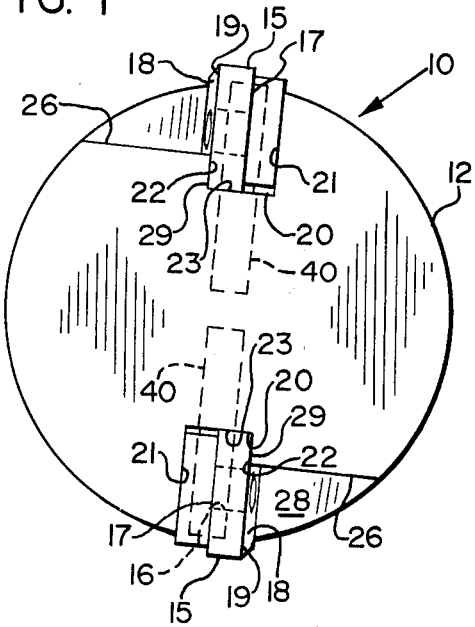
FIG. 1 is a top view of a rotary cutter constructed in accordance with the present invention.
Figure 2:
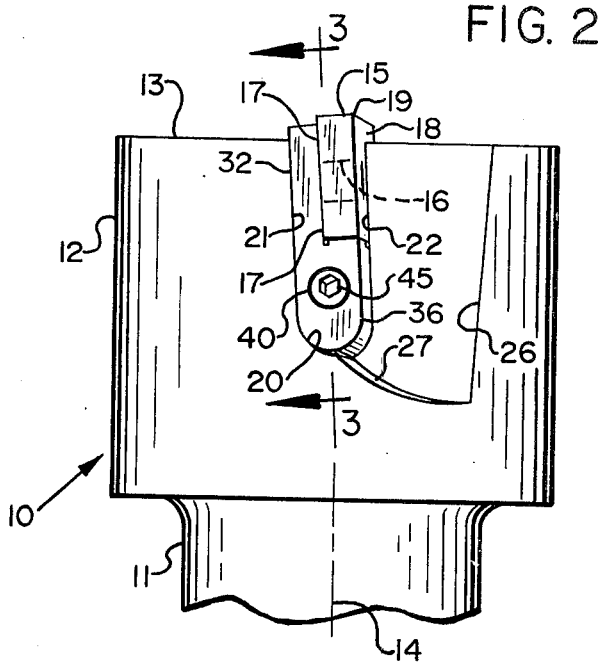
FIG. 2 is a side view of the cutter of FIG. 1.

Referring to the drawings and in particular to FIGS. 1-4, a cutting tool forming one embodiment of the present invention is illustrated in the form of a rotary or milling cutter 10 having a shank 11 terminating in a cylindrical head 12 whose work-facing surface 13 is disposed generally perpendicularly to the longitudinal axis 14 of the tool. The cutter 10 is illustrated as being rotatable about its axis 14, although it will be understood that cutting tools according to the present invention need not always be rotatable.

The cutter 10 herein illustrated is designed to accommodate, for example, two conventional replaceable carbide or ceramic inserts 15 of the pin-type. Each such insert 15 has a central aperture or bore 16, a back side or back face 17 and a front side or cutting face 18 comprising a cutting edge 19.

The cutter head 12 may be dished and is provided with two peripheral, generally radially extending recesses 20, each of which has a generally radially extending back wall 21, a front wall 22 parallel to the back wall 21 and a generally axially extending bottom surface or wall 23. A generally chordal cutout 26 is formed in the head 12 extending forwardly of the front wall 22 of the recess 20, the cutout 26 being formed with a circular cut 27 to form a bottom 28 intersecting the back wall 21 of the recess. The construction provides a radially extending lip 29 on the front wall 22 of the recess, the lip 29 serving to retain the insert 15 in the manner disclosed in my aforementioned U.S. Pat. No. 3,788,625.

A holder or nest 30 (see FIG. 4) is removably disposed within each of the recesses 20. As illustrated, each holder 30 comprises a generally rectangular upper portion 32 having a front side or face 33 and a back side or face 34 parallel thereto. A centrally disposed integral pin 35 extends perpendicularly forwardly or generally circumferentially of the front face 33 for engagement with the aperture 16 in the insert 15.

A feature of the present invention is the provision of a screw means receiving extension 36 integral with the portion 32 and having a back face 37 coplanar with the back face 34 of the portion 32 and a front face 38 parallel to face 37. When the holder 30 is disposed within the recess 20, the back face 34 of portion 32 and the back face 37 of extension 36 abut the back wall 21 of the recess, and the front face 38 of the extension 36 abuts the front wall 22.

Extension 36 is provided with a threaded, generally radially extending aperture 39 for receiving a screw 40 having a right hand thread 41 at its inner extremity 42 and a left-hand thread 43 at its outer extremity 44. The inner extremity 42 is threadedly received within the head 12, while the outer extremity 44 is threadedly received within the extension 36. The screw 40 is also provided with an internal wrenching socket 45 in its outer extremity 44, whereby rotation of the screw in the clockwise direction simultaneously engages the thread 41 into the head 12 and draws or clamps the holder 30 and insert 15 radially into the recess 20.

As can be seen from the drawings, the insert 15 is received on the pin 35 of the holder 30, the back side or face 17 of the insert engaging the front side or face 33 of the holder and the back side or face 34 of the holder together with the back side or face 37 of the extension 36 abutting the back wall 21 of the recess 20.

The chordal width of the recess 20 is formed equal to the combined thicknesses of the insert 15 and the portion 32 of the holder 30. The chordal width of the extension 36 is also equal to that of the insert 15 and the portion 32, whereby the assembly is snugly receivable into the recess 20, as shown. Tightening the screw 40 thus forces the holder 30 radially inwardly of the cutter head 12, drawing the insert 15 received on the pin 35 together with the holder 30 into the recess 20. The insert 15 and holder 30 bottom together in the recess 20, the insert 15 being held radially by the pin 35 and the front side or cutting face 18 engaging and being retained by the lip 29. The lip 29 prevents circumferential tipping of the insert 15 while the face 33 of the portion 32 provides circumferential support. Axially, the insert 15 is maintained in position by the pin 35, the holder 30 itself being held axially in position by the screw 40.

Forming the screw receiving extension 36 with a back face 37 coplanar with the back face 34 of the portion 32, i.e., positioning the extension 36 axially of the portion 32 rather than circumferentially, reduces the circumferential extent of the assembly and permits the cutter head 12 to provide adequate support for the holder 30 notwithstanding the cutter head 12 is of small diameter. The necessity for a circumferentially extending keying lug as provided in the construction disclosed in my aforementioned U.S. Pat. No. 3,788,625 is accordingly eliminated, as is the circumferentially extending keyway. The advantages inherent in the construction of my aforementioned patent are, however, still retained.

A further feature of the present invention is the provision of an axially extending locating face or boss 45 on a supporting surface or shoulder 46 formed between the extension 36 and the portion 32 and perpendicular to the face 33 thereof. When the holder 30 and the insert 15 are drawn fully into the recess 20 by the screw 40, the inwardly disposed side 47 of the insert 15 contacts the outermost portion of the bottom wall 23 of the recess 20 (see FIG. 3) and forces a second side 48 of the insert against the boss 45, thereby to achieve precise axial location of the cutting edge 19 as respects the work-facing surface 13 of the tool.

The extension 36 is further provided with a second radially extending locating boss 49 inwardly disposed between the back and front faces 37, 38 for engagement with the innermost portion of the bottom wall 23 of the recess. The boss 49 achieves accurate radial positioning of the assembly, as required.

Figure 3:
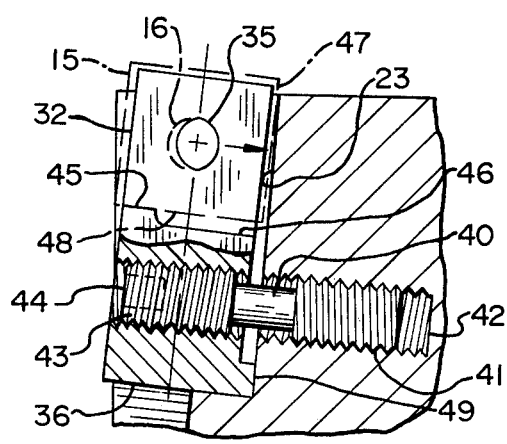
FIG. 3 is a partial sectional view to an enlarged scale taken on line 3—3 of FIG. 2.
Figure 4:
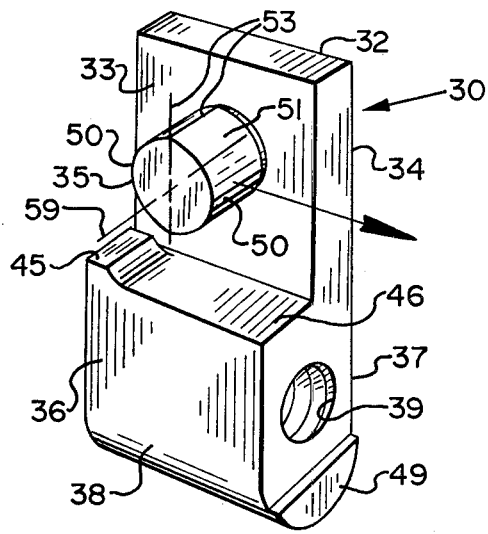
FIG. 4 is a perspective view of the insert holder of the present invention.
Figure 5:
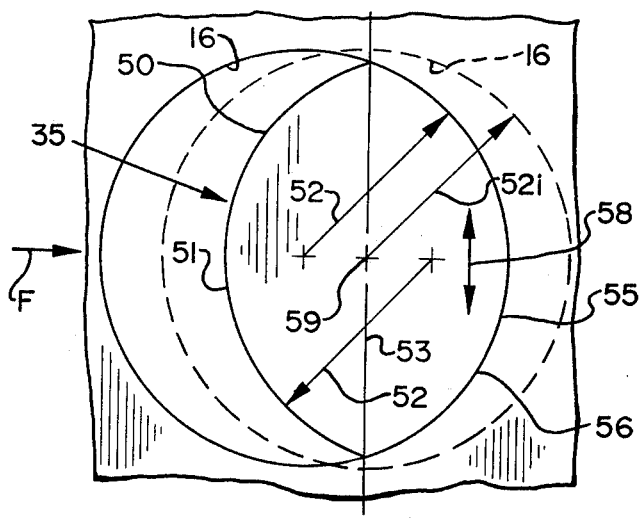
FIG. 5 is a diagramatic view illustrating the relationship between a preferred configuration for the insert retaining pin and the insert aperture showing in dotted lines the location of the aperture as the pin is received therein and in solid lines, the location of the pin as respects the aperture when the insert is fully seated in the recess.

As shown in FIGS. 3, 4 and 5, the pin 35 of the invention is not made in the form of a circular cylinder, but on the contrary, is formed of a pair of discrete opposed axially-extending portions 50, each of which constitutes a segment 51 of a circular cylinder having a periphery less than 180°. The radius 52 of each of the portions 51 is made equal to the radius 52$i$ of the aperture 16 in the cutting insert 15. This construction is as disclosed in my copending application, Ser. No. 4,909, filed Jan. 19, 1979, and is shown diagramatically to an exaggerated scale in FIG. 5.

The portions 51 are themselves oriented so that they meet in an imaginary plane 53, which is normal to the face 33 of the holder 30 and disposed perpendicularly to the axis of the aperture 39 and screw 40.

As disclosed in my aforementioned application Ser. No. 4,909, when the screw 40 is tightened to force the holder 30 radially inwardly of the cutter head 12, a force F acts on the pin 35 in the direction shown in FIGS. 4 and 5. This causes the insert 15 to be seated on the lateral surface 55 of the axially extending cylindrical segment 56 which is positioned radially inwardly of the cutting head 12. Since the radius 52 of the segment 56 is identical to the radius 52$i$ of the aperture 16, I achieve a positive seating of the insert 15 on the pin 35, as shown in FIG. 5, wherein the aperture 16 is shown in solid lines. The absolute concurrence of the lateral surface 55 of the segment 56 with the radially inwardly directed side of the aperture 16, permits no motion to occur in the direction of the arrows 58 as shown in FIG. 5, i.e., in a direction perpendicular to the axis 59 of the pin 35 and parallel to the plane 53, which is itself oriented perpendicularly to the axis of the aperture 39 and screw 40.

Positioning the screw receiving extension axially of the insert holder instead of circumferentially thereof, avoids the support problems which occur when the cutter body 12 is of small diameter. Locating the extension in this manner also simplifies construction. Providing the locating boss 45 achieves precise axial location of the insert 15 with respect to the work-facing surface 13 of the tool. Providing the boss 49 achieves precise radial positioning of the insert. Use of the particular pin construction disclosed further ensures extremely accurate insert positioning as respects the workfacing surface 13.

I claim:

1. In a cutter body having at least one recess extending inwardly of the periphery thereof for receiving an insert holder and a pin-type replaceable cutting insert having a circular aperture for receiving a cylindrical pin extending from a face of the insert holder to achieve a supporting relationship adjacent said face, said recess having an inwardly extending back wall and a front wall parallel thereto, said back and front walls defining a bottom surface therebetween, said bottom surface providing a support for at least one side of the insert, and a cutout extending from the front wall of the recess and meeting said front wall to form a lip therewith, the improvement comprising:

an insert holder received in said recess and having a back face abutting the back wall of said recess and a front face parallel to said back face for supporting a pin-type replaceable cutting insert having a circular aperture centrally disposed therein;

a pin extending perpendicularly to the front face of the insert holder;

a cutter insert received in said recess, said insert having a front face with a cutting edge and being provided with a central aperture, said insert being received on said pin, said insert having a back face engaging said front face of said insert holder and being supported thereby, said front face of said insert engaging said lip, said width of said recess being equal to the combined thicknesses of said insert holder and said insert;

a screw means receiving extension on said insert holder, said extension having a back face coplanar with the back face of said insert holder, said extension having a front face generally abutting the front wall of said recess; and screw means in said extension for moving said insert holder and said insert inwardly of said cutter body to force said holder and said insert into said recess and engage said front face of said insert with said lip;

said extension comprising:

a supporting surface perpendicular to the front face of said insert holder, and locating means disposed on said supporting surface for supporting a second side of the insert at a point remote from said one side thereof.

2. A cutter body as in claim 1 in which said locating means comprises a locating boss.

3. A cutter body as in claim 1 in which said extension comprises second locating means extending inwardly of said cutter body between said front and back faces of said extension for engagement with the bottom surface of said recess.

4. A cutter body as in claim 3 in which said second locating means comprises a second boss.

* * * * *